(12) United States Patent
Hodgson et al.

(10) Patent No.: US 6,507,679 B1
(45) Date of Patent: Jan. 14, 2003

(54) LONG DISTANCE, ALL-OPTICAL TELEMETRY FOR FIBER OPTIC SENSOR USING REMOTE OPTICALLY PUMPED EDFAS

(75) Inventors: Craig W. Hodgson, Thousand Oaks, CA (US); Donald A. Frederick, Simi Valley, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/311,030

(22) Filed: May 13, 1999

(51) Int. Cl.$^7$ .................................................. G02B 6/00
(52) U.S. Cl. ........................................ 385/12; 356/478
(58) Field of Search ............................. 385/12–16, 24, 385/31, 141; 359/115, 123, 124, 135, 161; 356/478; 367/149

(56) References Cited

U.S. PATENT DOCUMENTS

| | | | | |
|---|---|---|---|---|
| 5,589,937 A | * | 12/1996 | Brininstool | 356/352 |
| 5,696,857 A | * | 12/1997 | Frederick | 385/12 |
| 5,866,898 A | * | 2/1999 | Hodgson et al. | 250/227.14 |
| 6,034,934 A | * | 3/2000 | Vakoc | 367/149 |
| 6,097,486 A | * | 8/2000 | Vakoc et al. | 356/345 |
| 6,181,449 B1 | * | 1/2001 | Taga et al. | 359/124 |
| 6,282,334 B1 | * | 8/2001 | Hodgson et al. | 385/12 |
| 6,373,609 B1 | * | 4/2002 | Mizrahi | 359/161 |

FOREIGN PATENT DOCUMENTS

| | | |
|---|---|---|
| WO | WO 98/02898 | 1/1998 |
| WO | WO 98/16017 | 4/1998 |
| WO | WO 98/27406 | 6/1998 |
| WO | WO 98/30881 | 7/1998 |

* cited by examiner

*Primary Examiner*—Frank G. Font
*Assistant Examiner*—Michael P Mooney

(57) ABSTRACT

An optical sensor architecture receives an input optical signal from a signal source and outputs a perturbed optical signal from at least one sensor to a receiver. An optical amplifier is positioned along a return fiber at an optical distance at least 10 kilometers from the receiver, with the optical amplifier amplifying the perturbed optical signal propagating to the receiver. If only one optical amplifier is used, the optical distance between the amplifier and the receiver may be between about 10 km and about 80 km, and an optical distance of between about 10 km and about 150 km may separate the sensor and the receiver. If additional optical amplifiers and dedicated pump distribution fibers are used, the optical distances may be correspondingly greater. Alternatively, increasing the number of sensors necessitates a reduction in the optical distance separating the sensors from shore.

84 Claims, 8 Drawing Sheets

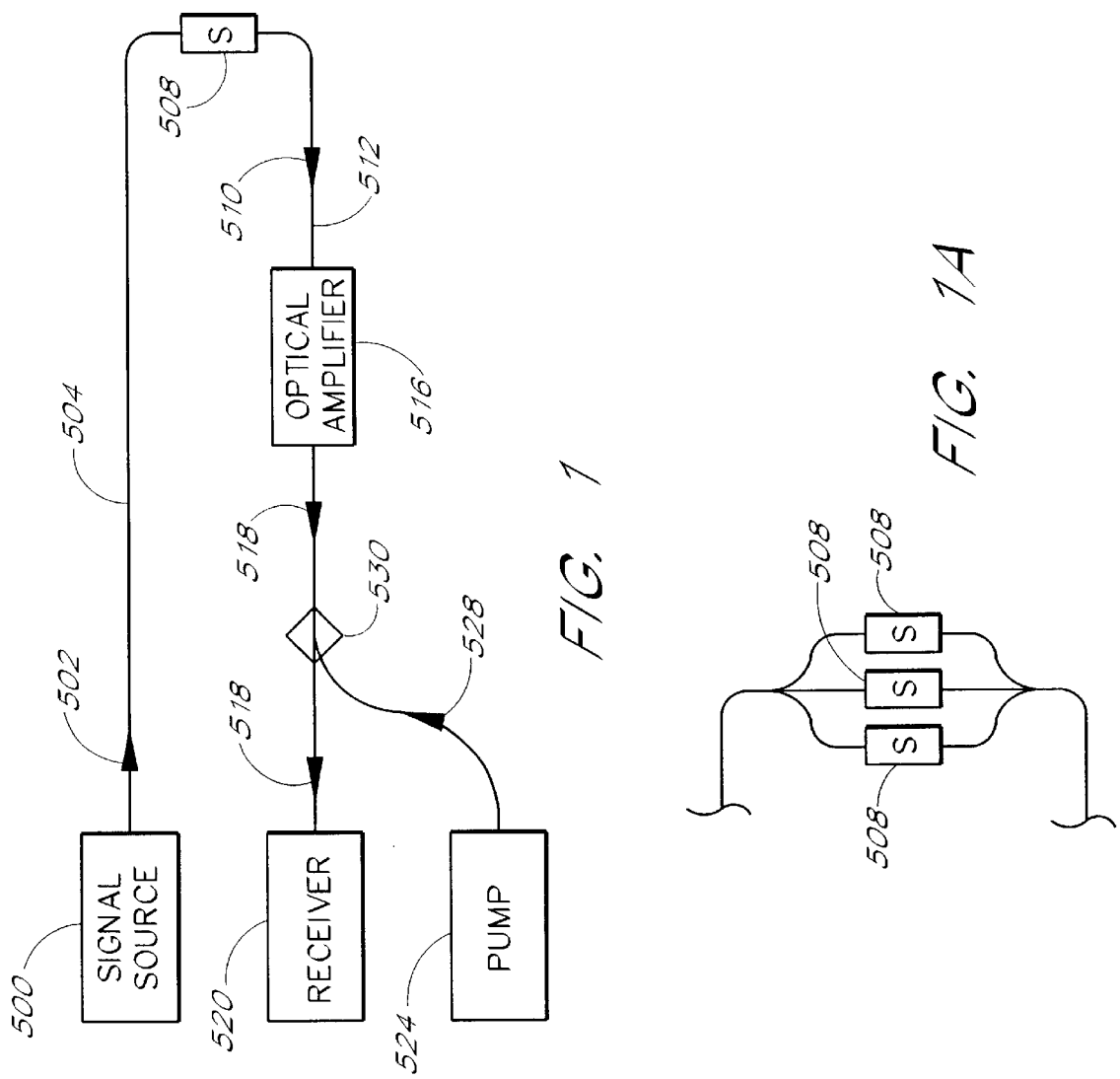

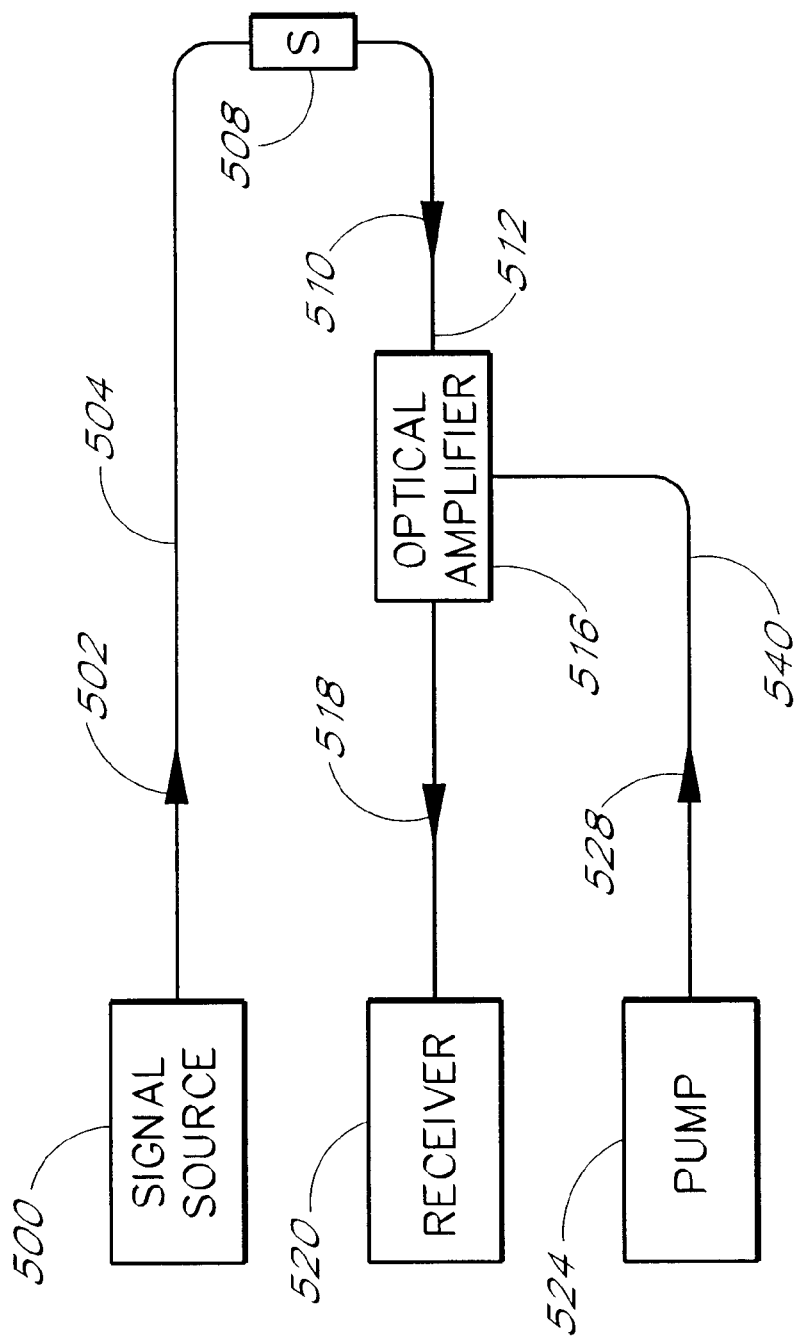

LONG DISTANCE, ALL-OPTICAL TELEMETRY FOR FIBER OPTIC SENSOR USING REMOTE OPTICALLY PUMPED EDFAS

BACKGROUND OF THE INVENTION

1. Field of the Invention

The present invention relates generally to sensor arrays for acoustic sensing systems.

2. Description of the Related Art

Fiber optic interferometric sensors shows promise in applications in which size, electrical interference, and electromagnetic detection make electronic sensors impractical. Such interferometric sensors are capable of measuring a parameter (i.e., a measurand) with a very high dynamic range (e.g., 120 dB) and have been used in acoustic sensing applications, for example. Fiber optic sensors are supplied optical signal power by signal sources, and their output is detected by receivers. As a practical matter, however, the distance separating the sensors from the signal sources (and the receivers) is limited by optical loss at the signal wavelength and by non-linear optical effects related to the signal light. Thus, it is difficult to construct an optical sensor architecture in which the distance separating the sensor (or sensors) from the optical signal source is very large.

SUMMARY OF THE INVENTION

One preferred embodiment of the invention is an optical sensor architecture which receives an input optical signal from a signal source and which outputs a perturbed optical signal to a receiver. The architecture comprises at least one sensor which receives the input optical signal and which outputs the perturbed optical signal. A signal distribution fiber is disposed between the sensor and the signal source to distribute the input optical signal to the sensor. A return fiber is disposed between the sensor and the receiver to couple the perturbed optical signal from the sensor to the receiver. An optical amplifier is positioned along the return fiber at an optical distance at least 10 kilometers from the receiver. The optical amplifier amplifies the perturbed optical signal propagating to the receiver.

Another embodiment is an optical sensor architecture which receives an input optical signal from a signal source and which outputs a perturbed optical signal to a receiver. The architecture comprises at least one sensor which receives the input optical signal and which outputs the perturbed optical signal. A signal distribution fiber is disposed between the signal source and the sensor to distribute the input optical signal to the sensor. A return fiber is disposed between the sensor and the receiver to couple the perturbed optical signal from the sensor to the receiver. The architecture further includes first and second optical amplifiers positioned along the return fiber at an optical distance at least 10 kilometers from the receiver. The first and second optical amplifiers receive and amplify the perturbed optical signal. The amplified perturbed optical signal is sent to the receiver. The first amplifier is located between the second amplifier and the sensor in the optical path. The architecture also includes at least one pump distribution fiber for pumping the amplifiers. The at least one pump distribution fiber is coupled to at least one pump source.

Yet another embodiment is an optical sensor architecture which receives an input optical signal from a signal source and which outputs a perturbed optical signal to a receiver. The architecture comprises at least one sensor which receives the input optical signal and which outputs the perturbed optical signal. A signal distribution fiber is disposed between the sensor and the signal source to distribute the input optical signal to the sensor. An optical amplifier is positioned along the signal distribution fiber at an optical distance at least 10 kilometers from the signal source for receiving and amplifying the optical signal. A return fiber is disposed between the sensor and the receiver to receive the perturbed optical signal. An optical amplifier is positioned along the return fiber at an optical distance at least 10 kilometers from the receiver for receiving and amplifying the perturbed optical signal. The amplified perturbed optical signal is sent to the receiver. At least one pump distribution fiber is interposed between at least one optical pump source and at least one of the signal distribution fiber amplifier and the return fiber amplifier.

Another embodiment is an optical sensor architecture which receives an input optical signal from a signal source and which outputs a perturbed optical signal to a receiver. The architecture comprises at least one sensor which receives the input optical signal and which outputs the perturbed optical signal. A signal distribution fiber is disposed between the sensor and the signal source to distribute the input optical signal to the sensor. An optical amplifier is positioned along the signal distribution fiber at an optical distance at least 10 kilometers from the signal source for receiving and amplifying the optical signal. A return fiber is disposed between the sensor and the receiver to receive the perturbed optical signal. The architecture further includes first and second optical amplifiers positioned along the return fiber at optical distances at least 10 kilometers from the receiver for receiving and amplifying the perturbed optical signal. The amplified perturbed optical signal is sent to the receiver. The first optical amplifier is located between the second amplifier and the sensor in the optical path. The architecture fturther comprises at least one pump distribution fiber between at least one optical pump source and at least one of the signal distribution fiber amplifier and the return fiber amplifiers.

Another embodiment of the invention comprises a method for distributing an input optical signal to and returning a perturbed optical signal from a sensor located at tens of kilometers from an optical signal source, an optical pump source, and an optical receiver. The method comprises outputting the optical signal from the optical signal source to an optical signal distribution fiber. The optical signal has a signal wavelength and a signal power level. The signal power level is selected to be approximately at or below a stimulated Brillouin scattering (SBS) threshold of the optical signal distribution fiber. Optical pump light is output from the optical pump source to an optical pump distribution fiber. The optical pump light has a pump wavelength and a pump power level. The pump power level is selected to be at a power level at or below a stimulated Raman scattering (SRS) threshold of the optical pump distribution fiber. The method also includes coupling a distribution amplifier to the signal distribution fiber and the optical pump distribution fiber. The amplifier has a gain when pumped by the pump light to amplify the optical signal to provide an amplified optical signal. The distribution amplifier is positioned at a distance from the optical pump source and the optical signal source so that the pump light and the optical signal have respective power levels at the distribution amplifier such that the distribution amplifier outputs the amplified optical signal at a power level approximately at or below the SBS threshold. The amplified optical signal is coupled to a sensor. The sensor perturbs and amplifies the optical signal and produces a perturbed optical signal on a return fiber. The perturbed optical signal is propagated to the optical receiver.

BRIEF DESCRIPTION OF THE DRAWINGS

FIG. 1 illustrates one preferred embodiment of the invention, in which an optical signal from an optical signal source is directed to a sensor that is removed at least 10 kilometers from the signal source, and in which one amplifier is positioned along a return bus, with the amplifier being pumped by a pump that propagates pump energy along the return bus.

FIG. 1A illustrates an array of sensors that can be used instead of the single sensor shown in FIG. 1.

FIG. 2A illustrates an embodiment similar to the embodiment of FIG. 1, except that the pump energy for the amplifier is directed through a dedicated pump distribution fiber.

DETAILED DESCRIPTION OF THE PREFERRED EMBODIMENT

Figure 2B:
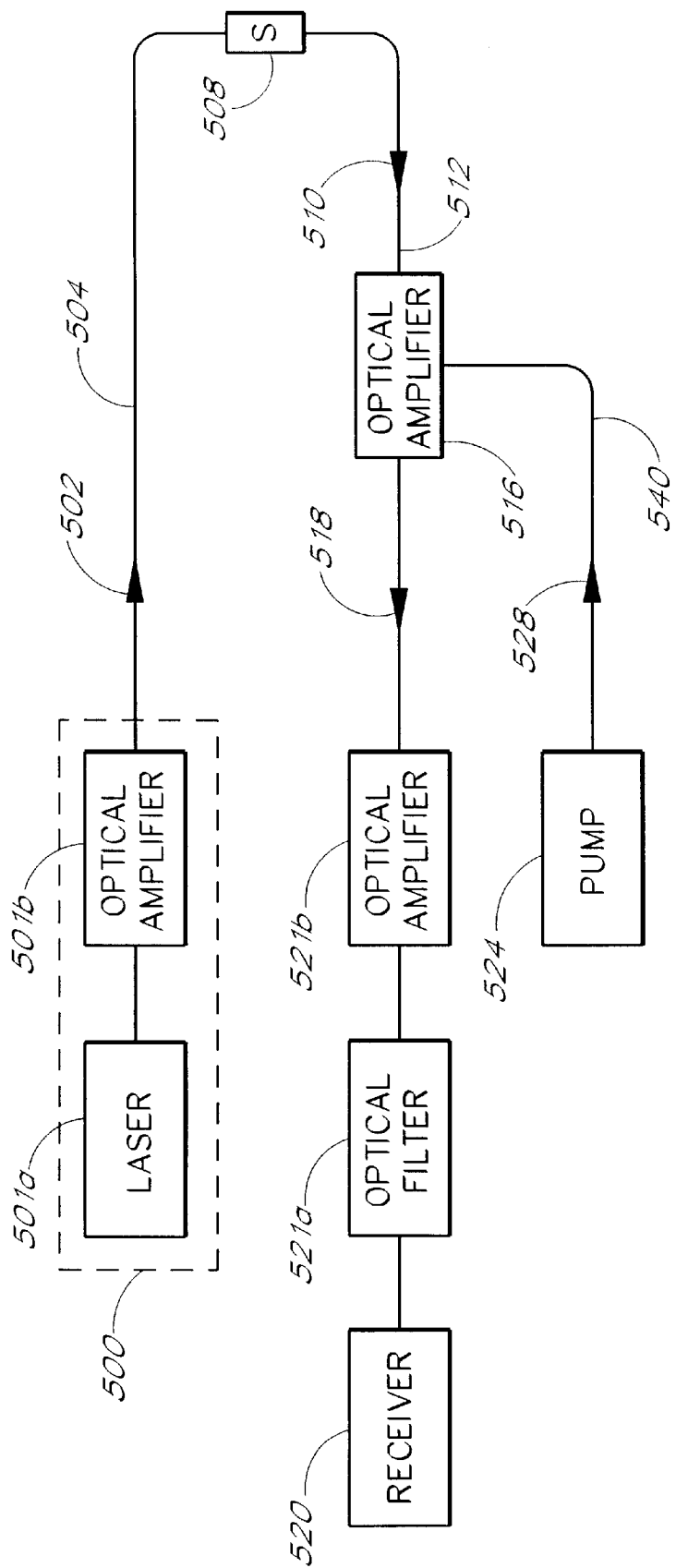
FIG. 2B illustrates preferred embodiments for the signal source and a receiver.

One preferred embodiment of the present invention is illustrated in FIG. 1, in which an optical signal source 500 couples an input optical signal 502 into a signal distribution fiber 504 that is optically coupled to a sensor 508. The sensor 508 receives the optical signal 502 as an input signal and outputs a perturbed optical signal 510 (in response to acoustical signals, for example) which is then directed into a return fiber 512. An optical amplifier 516 is located along the return fiber 512. The optical amplifier 516 amplifies the perturbed optical signal 510 before directing the amplified perturbed optical signal 518 towards a receiver 520. An optical pump source 524 may be advantageously coupled into the return fiber 512, via a WDM coupler 530, so that pump energy 528 from the optical pump source 524 is directed towards the amplifier 516. Thus, in the embodiment illustrated in FIG. 1, the perturbed optical signal 518 and the pump energy 528 are counterpropagating along the return fiber 512. Alternatively, as shown in FIG. 2A, the pump energy 528 may be directed through a dedicated pump distribution fiber (fiber 540) coupled directly into the optical amplifier 516.

The optical pump source 524 preferably includes a laser such as a 1480 nm fiber laser, which may have an output power of up to 2 W. The amplifier 516 preferably includes fiber doped with a rare earth element such as erbium or praseodymium, or alternatively, the amplifier 516 may be a Raman amplifier. The sensor 508 may advantageously be an interferometric sensor such as an acoustic hydrophone sensor. In the embodiments disclosed herein, a plurality of sensors 508 may be used rather than a single sensor, as illustrated in the inset of FIG. 1A. When an array of sensors is used, the input optical signal 502 may be multiplexed within the array using at least one of a number of techniques, such as frequency division multiplexing, time division multiplexing, and wavelength division multiplexing.

In the embodiment of FIG. 1, the optical distances are relatively large. In particular, the optical distance between the amplifier 516 and the receiver 520 is preferably between about 10 kilometers (km) and about 80 km, and is more preferably between about 20 km and about 40 km. The optical distance between the sensor 508 and the receiver 520 is preferably between about 10 km and about 150 km, and is more preferably between about 40 km and about 120 km.

An optical architecture in which a sensor is supplied with a signal source located at a great distance from the sensor presents special design problems. Namely, as this distance increases, stimulated Brillouin scattering (SBS) of the input signal becomes more significant for a given input signal power. Likewise, SBS becomes more significant as the input signal power increases. On the other hand, there must be enough input signal power directed towards the sensor that the power of the perturbed optical signal remains well above the noise level. SBS and SRS effects in fibers are discussed in Chapters 8 and 9 of "Nonlinear Fiber Optics," second edition, Govind P. Agrawal, Academic Press, 1989.

In addition to SBS, the designer also faces the problem of avoiding stimulated Raman scattering (SRS) of the pump source, which becomes significant when the pump source power is above the SRS threshold, and when the pump energy and the optical signal returned to the receiver propagate along the same fiber. However, the pump source power must supply the amplifier with enough power that the perturbed optical signal is amplified strongly enough to reach the receiver, but not so strongly that the amplified perturbed optical signal exceeds the SBS threshold. These problems are avoided in the current invention by carefully selecting the fibers, the input signal power, and the pump source power to avoid both SBS and SRS scattering effects. The selection process will be described in more detail below.

In view of the large optical distances discussed herein, and in order to reduce SBS effects, the signal distribution fiber 504 and the return fiber 512 may advantageously have large diameters, with cross-sectional areas of 30–90 $\mu m^2$. Further, fibers with cross sections of 70–90 $\mu m^2$ may accommodate up to 2W of pump energy 528 without inducing SRS.

The placement of the optical amplifier 516 depends on a number of parameters. For example, a stronger optical input signal 502 requires less amplification than a weaker optical input signal. In general, the optical input signal 502 should be as strong as possible without leading to significant SBS. Given current fiber technology, this corresponds to an upper bound of about 10 mW for the power in the optical input signal 502. The amplification required also depends upon the optical losses in the system, so that it is desirable to minimize optical losses wherever possible. For example, the signal distribution fiber 504 and the return fiber 512 are preferably selected to have as little optical loss as possible. Given current fiber technology, this corresponds to 0.21 dB/km for good fiber at 1550 nm and 0.19 dB/km for premium grade fiber at 1550 nm. The locations of the sensor 508, the receiver 520, and the pump 524 are generally dictated by the mission of the optical architecture. The loss budget for the optical architecture can then be calculated without regard to gain from the optical amplifier 516. The location of the amplifier 516 may be advantageously selected such that the total self noise for the system is about 8 dB under the desired minimum ambient noise level. A noise level higher than this may exceed a prudent safety margin, whereas a noise level lower than this may be indicative of an overdesigned system that could be redesigned at lower cost. The process of selecting and locating amplifiers will be discussed in more detail below.

FIGS. 2A and 2B illustrate an alternative topology which reduces the SRS limitation on the pump by utilizing a separate pump distribution fiber 540 to supply the pump power 528 to the return amplifier 516. In the embodiments of FIGS. 2A and 2B, the optical distance separating the amplifier 516 and the receiver 520 is preferably between about 10 km and about 130 km, and is more preferably between about 20 km and about 80 km. The optical distance between the sensor 508 and the receiver 520 is preferably between about 10 km and about 200 km, and is more preferably between about 40 km and about 120 km. FIG. 2B is a preferred implementation of FIG. 2A, illustrating that the signal source 500 may advantageously include a laser 501a coupled to an optical amplifier 501b, and that the receiver 520 may be advantageously augmented by an optical filter 521a (such as an amplified spontaneous emission (ASE) filter) and an optical amplifier 521b—the signal source 500 and the receiver 520 of the other embodiments disclosed herein may also be configured in this manner.

Figure 3:
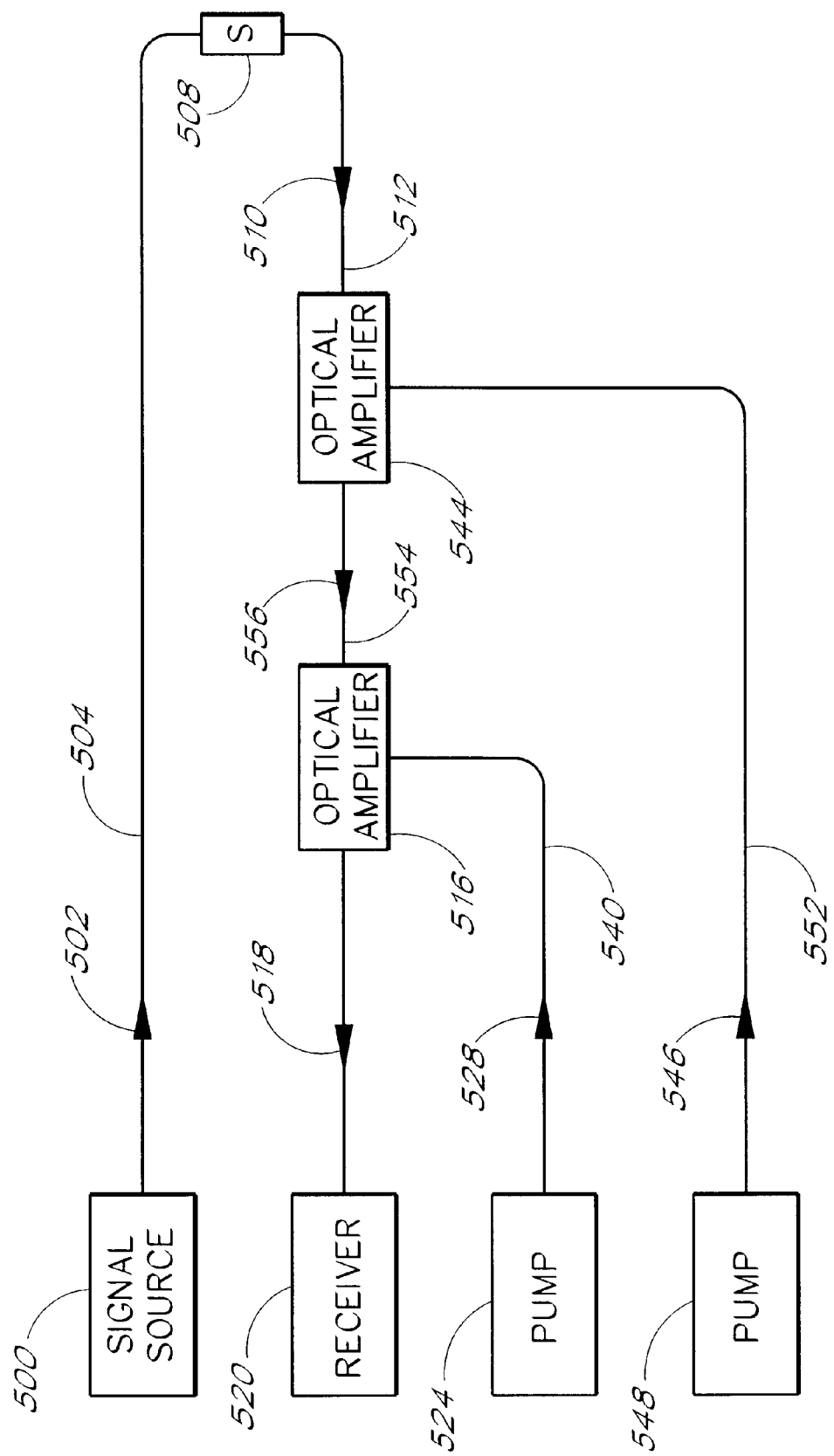
FIG. 3 is an embodiment similar to the embodiment of FIG. 1, except that two optical amplifiers are positioned along the return bus.

Another embodiment that illustrates the remote pumping features of the invention is shown in FIG. 3. In FIG. 3, a second optical amplifier 544 (similar to the amplifier 516) has been added to the return fiber 512 to provide additional amplification of the perturbed optical signal 510. By using two optical amplifiers 516 and 544 on the return fiber 512, the power of the perturbed optical signal 510 can be amplified first by the optical amplifier 544 and then by the optical amplifier 516. The optical amplifier 544 is preferably designed to provide a moderate amount of gain (5–15 dB) for a weak signal (−55 to −20 dBm) with good noise performance (NF better than 6 dB) when supplied with relatively low pump power (−2–20 mW). The optical amplifier 516 is preferably designed to provide large gain (10–35 dB) for a weak signal (−50 to about −15 dBm) with good noise performance (NF better than 7 dB) when supplied with low to moderate pump power (5–40 mW).

The optical amplifier 544 is preferably pumped by pump energy 546 from an optical pump 548 (like optical pump 524) propagating through a pump distribution fiber 552. The optical pump 548 is preferably dedicated to the amplifier 544; however, the optical amplifiers 516 and 544 may share a common pump source and share a common distribution fiber (not shown). For example, pump energy may be split from a single pump source (not shown) and directed along separate pump distribution fibers to the amplifiers 516 and 544. Alternatively, pump energy may be directed into a pump distribution fiber and split by a coupler (not shown) positioned along that fiber, with the coupler being located well downstream of the pump source and close to one of the amplifiers 516 and 544. Also, all of the pump energy may be directed via a pump distribution fiber to one of the amplifiers 516 and 544, with the pump energy being split (not shown) at that amplifier and directed through the return fiber 512 to the other of the amplifiers, so that both amplifiers are pumped.

In the embodiment of FIG. 3, the optical distance separating the receiver 520 and the optical amplifier 516 is preferably between about 10 km and about 100 km, and is more preferably between about 20 km and about 80 km. The optical distance separating the receiver 520 from the amplifier 544 is preferably between about 10 km and about 150 km and is more preferably between about 40 km and about 150 km. The optical distance separating the receiver 520 from the sensor 508 is preferably between about 10 km and about 200 km, and is more preferably between about 40 km and about 180 km.

The signal transmission loss along that portion of the return fiber 512 between the optical amplifier 544 and the optical amplifier 516 (indicated by numeral 554) is preferably less than the gain provided by the optical amplifier 544, so that the signal power in the system is at a minimum when entering the optical amplifier 544. In other words, the signal power 556 entering optical amplifier 516 should preferably be greater than the power level of the signal 510 entering the optical amplifier 544. The gain of the amplifier 544 may be determined in view of the available pump power and the distance of the amplifier 544 from shore. The loss between the amplifiers 544 and 516 may be determined by taking into account the loss of the fiber segment 544 and the loss of any other optical components between the amplifiers 544 and 516.

Figure 4A:
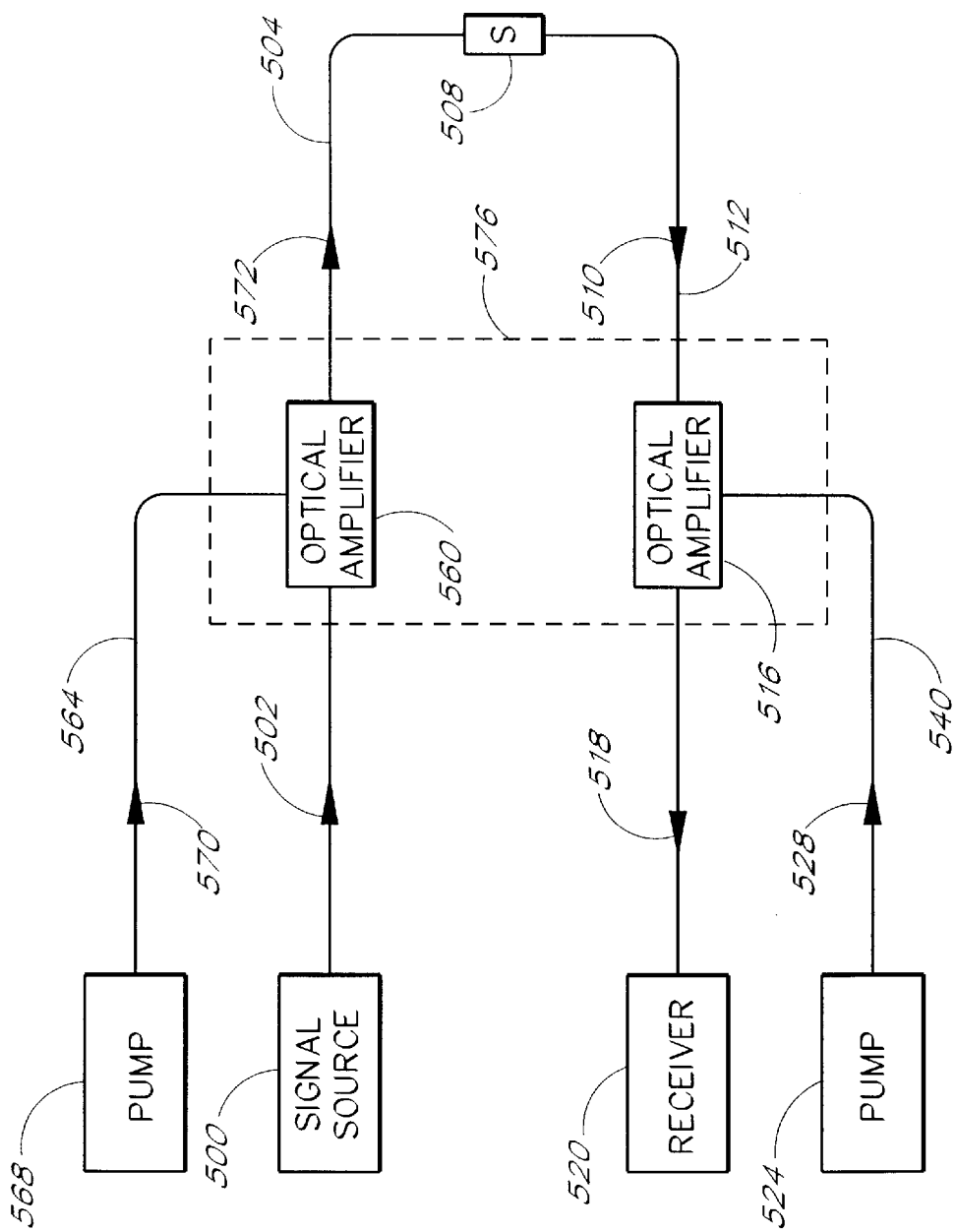
FIG. 4A illustrates another preferred embodiment of the invention, in which an optical signal from an optical signal source is directed to a sensor that is removed at least 10 kilometers from the signal source, and in which one amplifier is positioned along a distribution bus and another amplifier is positioned along a return bus, with the amplifiers being pumped by at least one pump that propagates pump energy along at least one pump distribution fiber.

Another embodiment is illustrated in FIG. 4A, in which an amplifier 560 is positioned along the signal distribution fiber 504. The optical amplifier 560 is preferably designed to provide moderate gain (10–23 dB) for a high output signal (5 to 17 dBm) with moderate noise performance (NF better than 12 dB) when supplied with moderate pump power (10–50 mW). Use of the amplifier 560 allows the power of the input optical signal 502 to be smaller, thereby avoiding SBS effects. The amplifier 560 preferably has a dedicated pump distribution fiber 564 (like the pump distribution fiber 540), and may have a dedicated optical pump source 568 (like the pump source 524) for generating pump energy 570. However, the amplifiers 516 and 560 may share a common pump source. The input optical signal 502 is amplified by the amplifier 560 to produce an amplified input optical signal 572 which is directed toward the sensor 508, in which the input optical signal 572 is advantageously just below the SBS limit. Preferably, the signal power level of the signal 572 exiting the optical amplifier 560 is nearly the same as the signal power level of the signal 502 exiting the signal source 500. If the amplifiers 560 and 576 are the same distance from shore, they may be advantageously contained within a common housing 576.

In the embodiment of FIG. 4A, the optical distance separating the amplifier 560 from the signal source 500 is preferably between about 10 km and about 130 km, as is the optical distance separating the amplifier 516 from the receiver 520. More preferably, these optical distances are between about 20 km and about 80 km. The optical distance between the sensor 508 and the receiver 520 is preferably between about 10 km and about 200 km, and is more preferably between about 40 km and about 180 km.

Figure 4B:
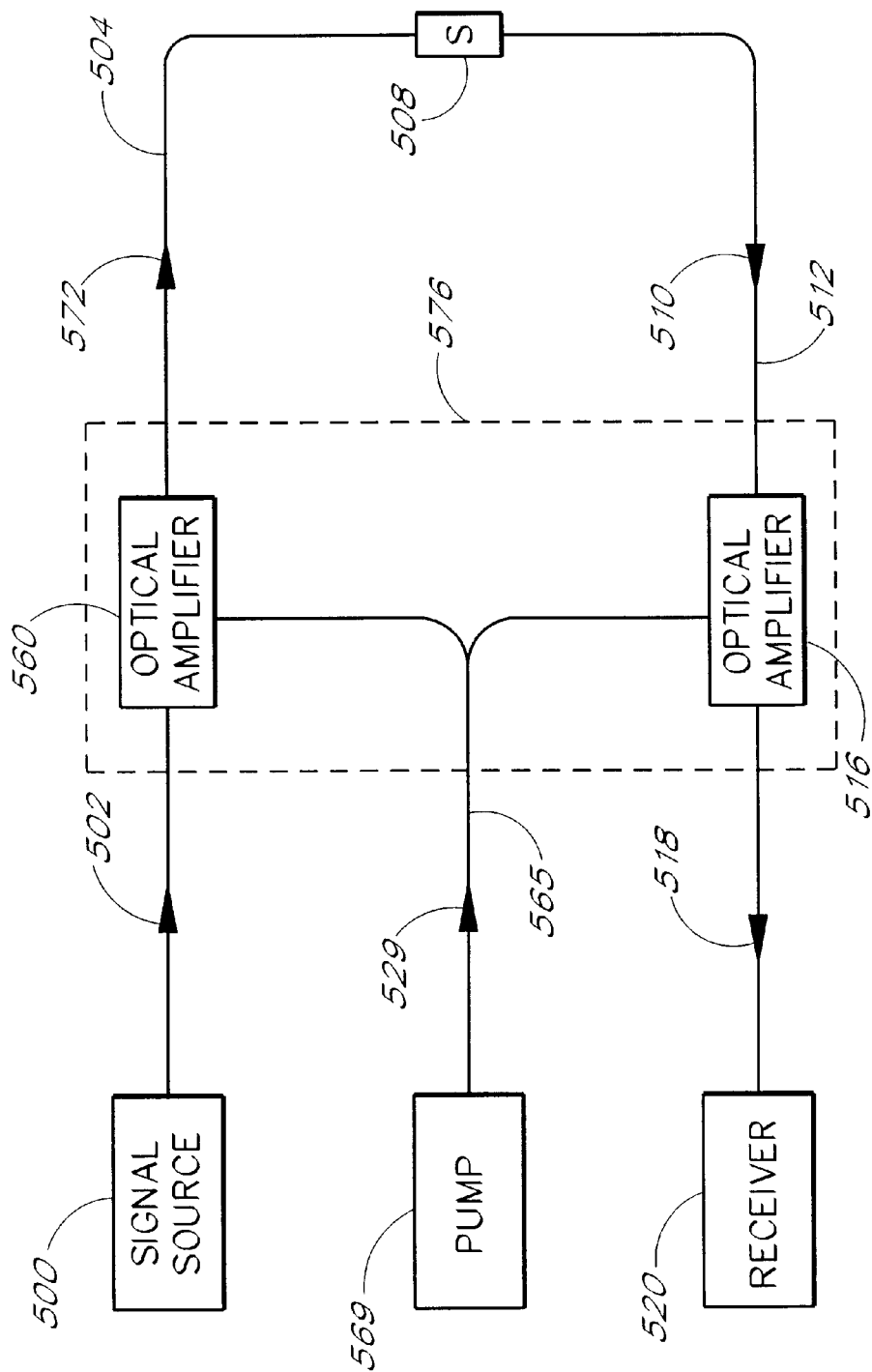
FIG. 4B is similar to the embodiment of FIG. 4A, with a single pump source being used to propagate energy along a pump distribution fiber that supplies energy both optical amplifiers.

In the embodiment of FIG. 4A, as in the other embodiments disclosed herein, a plurality of sensors 508 in an array may be used instead of a single sensor. Because of the presence of the amplifier 560, however, between 6 and 12 (or even between 2 and 20) sensors 508 may be used, rather than just a single sensor. However, given current fiber technology, an appropriate rule of thumb is that doubling the number of sensors 508, while maintaining the same performance level, necessitates reducing the distance between shore and the sensors 508 by approximately 15 km. On the other hand, working with fewer sensors 508 allows the sensors to be located further from shore. Thus, there is a tradeoff between the number of sensors 508 employed and their distance from shore. Once again, the input optical signal 502 may be multiplexed within such an array using one or more of a number of techniques, such as frequency division multiplexing, time division multiplexing, and wavelength division multiplexing. FIG. 4B illustrates how a single pump distribution fiber 565 may be used to pump a plurality of amplifiers, a principle which may be utilized in the other embodiments disclosed herein. In the embodiment of FIG. 4B, a single optical pump source 569 couples pump energy 529 into the pump distribution fiber 565, which is then directed into the amplifiers 560 and 516.

Figure 5:
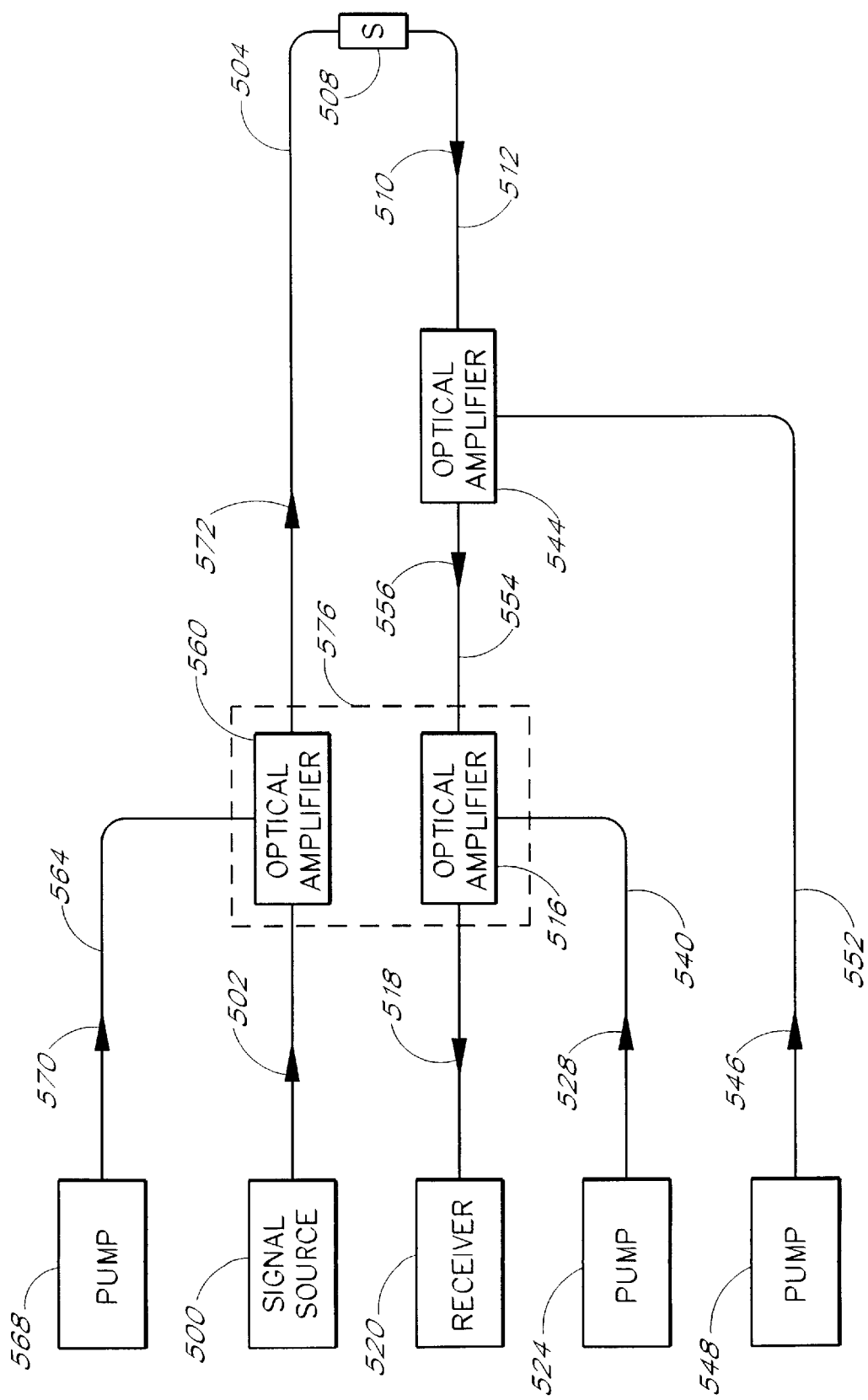
FIG. 5 is an embodiment similar to the embodiments of FIGS. 4A and 4B, except that two optical amplifiers are positioned along the return bus.

As illustrated in FIG. 5, an additional amplifier may be added along the return fiber. The power level of the signal 502 exiting from the signal source 500 is preferably just below the SBS limit, as is the power level of the signal 572 exiting the optical amplifier 560. The power level of the signal 556 entering the optical amplifier 516 is preferably greater than the power level of the signal 510 entering the optical amplifier 544, so that the signal power in the system is at a minimum when entering the optical amplifier 544. An additional pump distribution fiber for distributing pump energy to this additional amplifier (as shown in FIG. 3) is shown as well. The amplifier 560 and the amplifier 516 may be advantageously placed within the same housing 576.

In the embodiment of FIG. 5, the optical distance between the first return amplifier 544 and the receiver 520 is preferably between about 10 km and about 150 km, and is more preferably between about 40 km and about 150 km. The optical distance between the second return amplifier 516 and the receiver 520 is preferably between about 10 km and about 100 km, and is more preferably between about 10 km and about 80 km. The optical distance between the distribution amplifier 560 and the signal source 500 is preferably between about 10 km and about 100 km, and is more preferably between about 10 km and about 80 km. The optical distance between the sensor 508 and the receiver 520 is preferably between about 10 km and about 250 km.

The present invention includes a method for selecting the location or locations of the one or more amplifiers in the systems described above. The locations of the amplifiers are determined by a number of optical parameters; however, the delivery of pump energy to the amplifiers is used in the present method to determine amplifier location.

The amount of energy applied to a particular optical fiber is constrained by the cross-sectional area of the fiber core and by the quality of the fiber. For example, a commercially available silica fiber having germanium oxide ($GeO_2$) dopants and a typical cross-sectional area may be supplied with approximately 2 watts of pump energy at 1,480 nanometers, which is the approximate stimulated Raman scattering (SRS) threshold of the fiber. If an attempt is made to input a greater amount of pump energy, stimulated Raman scattering may occur within the fiber, which may cause noise problems as well as causing a portion of the pump energy to be wasted.

Similarly, the amount of signal energy that can be applied to a particular fiber is also limited. In particular, when an optical signal is input to an exemplary $GeO_2$ doped silica fiber, stimulated Brillouin scattering (SBS) may occur if the optical signal has more energy than an SBS threshold of approximately 20 milliwatts.

The initial pump energy and signal energy input to the respective pump fiber and signal fiber encounter losses in the respective fibers. An optical fiber has different losses at different wavelengths. For example, in an exemplary $GeO_2$ doped silica fiber, the loss of the fiber at an optical signal wavelength of approximately 1,550 nanometers is a minimum of approximately 0.21 dB per kilometer. On the other hand, the pump energy at 1,480 nanometers is not at a minimum loss wavelength, and, for example, the pump energy may encounter fiber losses of approximately 0.23 dB per kilometer.

An exemplary optical amplifier, such as, for example, an erbium-doped fiber amplifier (EDFA) provides gain in response to the pump energy applied to it. In accordance with the method of the present invention, a distribution amplifier (e.g., amplifier 560) is selected to efficiently convert pump energy to signal energy. For example, EDFAs are available which have a quantum efficiency of approximately 90 percent in converting pump energy at 1,480 nanometers to signal energy at 1,550 nanometers. Thus, for example, approximately 23.3 milliwatts of pump energy can produce 20 milliwatts of signal energy, which brings the signal level back to the SBS threshold (20 mW=[(1480/1550)×0.9]×23.3 mW). With this information, the location of the distribution amplifier 560 is determined by calculating the maximum length of pump fiber that can be used such that the amount of pump energy remaining at the distribution amplifier 560 is at least 23.27 milliwatts. For example, using an initial pump input of 2 watts and a loss of 0.23 dB per kilometer, a length of optical fiber of approximately 90 kilometers could be used. However, in one particular embodiment, a 73-kilometer length of optical fiber is used to accommodate additional coupler losses and the like and also to permit a lower initial level of pump energy to be applied to the pump fiber 564.

It is not advantageous to over pump the distribution amplifier 560 because of the SBS threshold of the optical signal fiber 504 from the amplifier 560 to the sensor 508. The excess energy is wasted and the stimulated Brillouin scattering may cause optical noise which degrades system performance. Thus, if the pump power reaching the distribution amplifier 560 is in excess of the pump power needed to cause the optical signal 502 to be amplified to the SBS threshold, it is preferable to reduce the pump power applied to the input of the pump fiber 564.

On the other hand, if the pump energy reaching the distribution amplifier 560 is insufficient to amplify the optical signal 502 to the SBS threshold, the distance that the sensor 508 can be placed from the distribution amplifier 560 is reduced because there may not be sufficient signal power reaching the sensor 508. In the preferred embodiment, when the optical signal 502 is amplified to the SBS threshold by the distribution amplifier 560, the sensor 508 may be located up to approximately 152 kilometers from the distribution amplifier 560 or a total of approximately 225 kilometers from the pump source 568 and the signal source 500.

After selecting the location of the distribution bus amplifier 560, then the location (or locations) of the return bus amplifier 516 (or amplifiers 516 and 544) is selected. In particularly preferred embodiments, as discussed above, at least one return bus amplifier is located at the same distance from shore as the distribution bus amplifier 560 so that the return bus amplifier 516 can be advantageously housed in the same housing 576 as the distribution bus amplifier 560. This significantly reduces costs by having only one common housing 576 for the two amplifiers 516 and 560. If more than one return bus amplifier is included, the return bus amplifier 516 closest to the shore and thus closest to the pump source is referred to as the proximal return bus amplifier and a second return bus amplifier 544 located further from shore is referred to as the distal return bus amplifier.

Preferably, the proximal return bus amplifier 516 does not have to provide as much signal output power as the distribution bus amplifier 560. In particular, the proximal return bus amplifier 516 can be selected to have moderate gain, low noise, a low to moderate input signal requirement, and a low to moderate pump power requirement. For example, in an exemplary proximal amplifier 516, 20 milliwatts of pump power provides 20–25 dB of gain at the signal wavelength and has a noise figure better than 7 dB.

The distal (i.e., farthest from shore) return bus amplifier 544 is selected to have low gain but a good noise figure for weak signals because the distal amplifier 544 operates with a weak pump signal 546 considering the distance of the distal amplifier 544 from its pump source 548. In particular embodiments, the distal amplifier 544 uses commercially available erbium-doped fiber which provides approximately 12 dB of gain from approximately 2 milliwatts of pump power. The preferred distal amplifier 544 has a noise figure better than 6 dB. The low gain of the distal amplifier 544 is sufficient because the purpose of the distal amplifier 544 is to provide sufficient signal power to propagate the signal to the proximal amplifier 516 without adding significant noise.

In the preferred embodiments, the gain of the distal amplifier 544 is selected to be greater than the gain of the proximal amplifier 516 so that the signal power 556 input to the proximal amplifier 516 is greater than the signal power 510 input to the distal amplifier 544. With this selection criterion, the system noise performance is determined by the signal power 510 level input to the distal amplifier 544 plus the noise figure of the distal amplifier 544.

The distal amplifier 544 operates with very low signal 510 input levels. For example, the minimum level of signal power that reaches the distal amplifier 544 from the sensor 508 and still satisfies the noise performance of the system can be in a range of approximately –30 dBm to –60 dBm (i.e., a range of approximately 1 microwatt to approximately 1 nanowatt). For example, when the sensor 508 is located approximately 152 kilometers from the distribution amplifier 560, as discussed above, the distal amplifier 544 can be located as far as approximately 95 kilometers from the sensor 508 and still receive an adequate signal level. Using the locations described herein, wherein the sensor 508 is located approximately 225 kilometers from the shore (i.e., from the pump sources 568, 524, 548 and the signal source 500 and from the receiver 520) and wherein the proximal return bus amplifier 516 is located approximately 73 kilometers from shore, then the distal amplifier 544 only needs to amplify the return optical signal 512 from the sensor 508 to an energy level sufficient to propagate approximately 57 kilometers to the proximal amplifier 516 and to arrive at the proximal amplifier 516 with sufficient energy to be amplified by the proximal amplifier 516 to a level sufficient to reach the shore (i.e., the receiver 520) from the proximal amplifier 516. Hence, as discussed above, approximately 12 dB of gain is sufficient for the distal amplifier 544. Preferably, the proximal amplifier 516 has sufficient gain to amplify the signal 556 received from the distal amplifier 544 to an energy level sufficient to reach the shore with sufficient energy that the energy received by the receiver 520 is greater than the energy level of the signal 556 at the input to the proximal amplifier 516. When this criterion is satisfied, the losses from the proximal amplifier 516 to the receiver 520 are not significant to the system design. In particular, the system noise is dominated by the noise of the signal 556 at the input to the proximal amplifier 516 added to the noise figure of the proximal amplifier 516. Since, as discussed above, the gain of the distal amplifier 544 is greater than the gain of the proximal amplifier 516 so that the signal power input 556 to the proximal amplifier 516 is greater than the signal power input 510 to the distal amplifier 544, then the system noise performance is determined by the signal power level input 510 to the distal amplifier 544 and by the noise figure of the distal amplifier 544. Thus, by designing the distal amplifier 544 to have a satisfactory noise figure, the system noise performance is also maintained within a satisfactory range.

If, after optimizing the locations of the amplifiers and the gains of the amplifiers, as discussed above, it is desired to position the sensor 508 farther from the shore (i.e., farther from the pump sources 568, 524, 548 and the signal source 500) than permitted by the system components, then the exemplary optical fiber can be replaced with a fiber with lower losses and higher SBS and SRS thresholds. For example, a fiber having a larger cross-sectional area can be used. Alternatively or in addition, a fiber can be selected which uses different dopants. For example, the silica fiber doped with $GeO_2$ can be replaced with a pure silica fiber without the $GeO_2$ dopant. In such a case, it may be necessary to down-dope the cladding (e.g., add fluorine dopant to the cladding) to increase the propagation velocity within the cladding to continue to guide the light within the core. It has been found, for example, that an optical fiber with a pure silica core may have losses of approximately 0.16 dB per kilometer compared to losses of approximately 0.19 dB per kilometer for premium grade conventional $GeO_2$ doped fiber.

Figure 6:
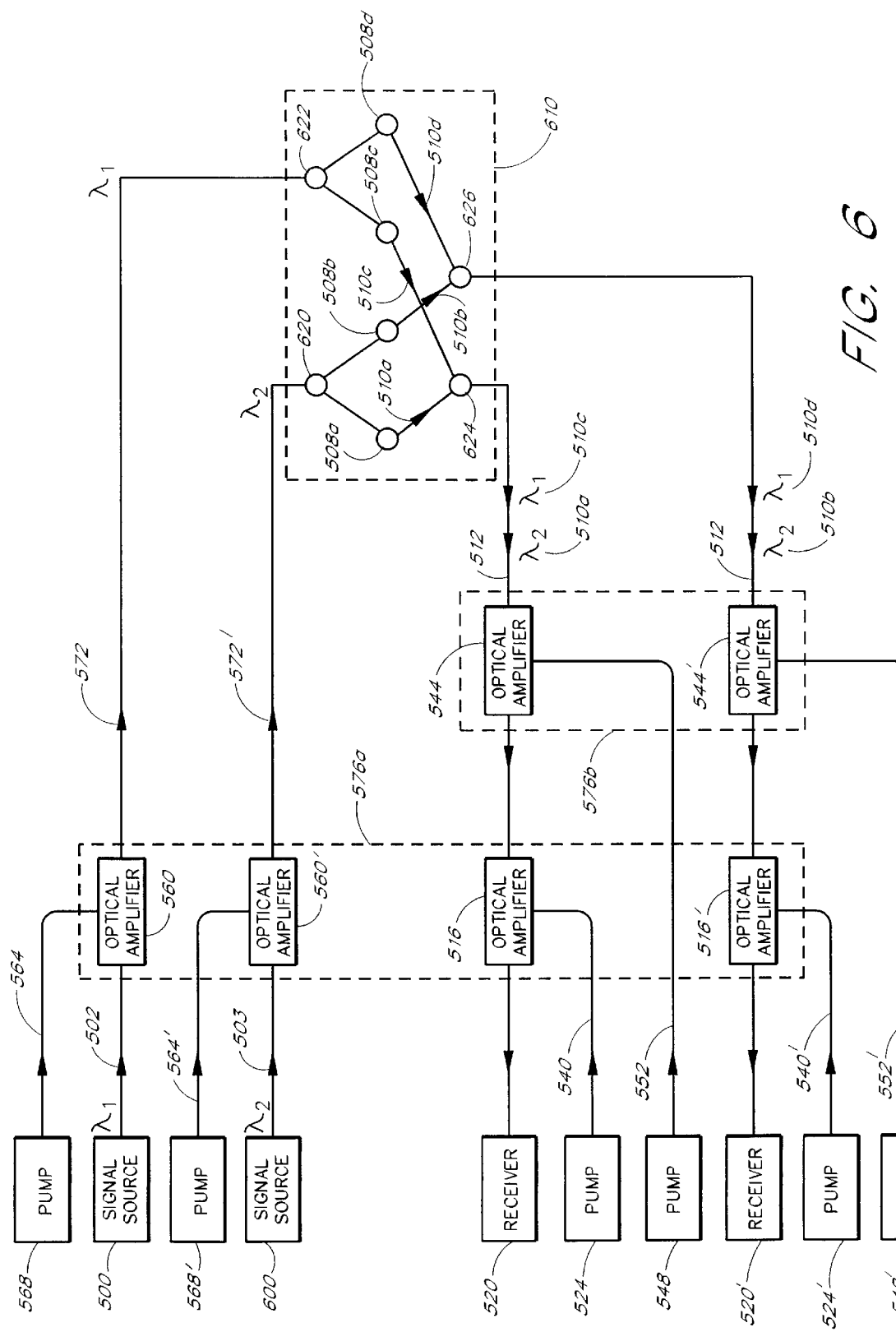
FIG. 6 illustrates a remote pumping embodiment that advantageously employs optical signal sources that operate at two different wavelengths.

FIG. 6 illustrates a remote pumping embodiment that advantageously employs optical signal sources 500 and 600 operating at wavelengths $\lambda_1$ and $\lambda_2$, respectively, in which these wavelengths are different from each other. As used herein, signals of different wavelengths means signals that can be separated by optical means. (Currently, the industry standard is 100 GHz spacing between wavelengths, corresponding to 0.8 nm at 1550 nm. However, 1 GHz spacing corresponding to 0.008 nm at 1550 nm has also been demonstrated.) The optical signal sources 500 and 600 output respective input optical signals 502 and 503 which are amplified by respective amplifiers 560 and 560' to generate respective amplified outputs 572 and 572'. The amplified input optical signals 572 and 572' are directed towards sensors 508a, 508b, 508c, 508d within a sensor array 610 via input couplers 620 and 622. Each of the couplers 620 and 622 is optically connected to respective pairs of sensors, namely, 508a and 508b, and 508c and 508d, respectively. The respective perturbed optical signals 510a, 510b, 510c, 510d from the sensors 508a–508d are coupled via output couplers 624, 626 such that each of the output couplers receives a perturbed optical signal at each of the wavelengths $\lambda_1$ and $\lambda_2$. Specifically, sensors 508a and 508c are coupled to coupler 624, and sensors 508b and 508d are coupled to coupler 626, so that the system is wavelength division multiplexed on the return fibers 512 and 512' (which are coupled to couplers 624 and 626, respectively). The perturbed optical signals 510a and 510c, and 510b and 510d, are amplified by respective pairs of amplifiers 544 and 516, and 544' and 516', and detected by receivers 520 and 520', respectively.

The amplifiers 560 and 560' may be pumped by respective pumps 568 and 568' via respective pump distribution fibers 564 and 564'. Further, the amplifiers 544 and 516 may be pumped by respective pumps 548 and 524 via respective pump distribution fibers 552 and 540. Likewise, the amplifiers 544' and 516' may be pumped by respective pumps 548' and 524' via respective pump distribution fibers 552' and 540'. The amplifiers 560, 560', 516, and 516' may be advantageously contained in a common housing 576a, and the amplifiers 544 and 544' in a common housing 567b. Although the wavelength division multiplexing of FIG. 6 has been illustrated with respect to a system having one amplifier on each signal distribution fiber and a pair of amplifiers on each signal return fiber, more or fewer amplifiers may be employed depending upon the application. The preferred optical distances separating the elements of FIG. 6 correspond to those indicated for the embodiment of FIG. 5.

While preferred embodiments of this invention have been disclosed herein, those skilled in the art will appreciate that changes and modifications may be made therein without departing from the spirit and scope of the invention as defined in the appended claims.

What is claimed is:

1. An optical sensor architecture which receives an input optical signal from a signal source and which outputs a perturbed optical signal to a receiver, comprising:
   at least one sensor which receives the input optical signal and which outputs the perturbed optical signal;
   a signal distribution fiber disposed between said sensor and the signal source to distribute the input optical signal to said sensor;
   a return fiber disposed between said sensor and the receiver to couple the perturbed optical signal from said sensor to the receiver; and
   an optical amplifier positioned along said return fiber at an optical distance at least 10 kilometers from the receiver, said optical amplifier amplifying the perturbed optical signal propagating to the receiver.

2. The architecture of claim 1, wherein the optical distance between said amplifier and the receiver is between about 10 km and about 80 km.

3. The architecture of claim 1, wherein the optical distance between said amplifier and the receiver is between about 20 km and about 40 km.

4. The architecture of claim 1, wherein an optical distance of between about 10 km and about 150 km separates said sensor and the receiver.

5. The architecture of claim 1, wherein an optical distance of between about 40 km and about 120 km separates said sensor and the receiver.

6. The architecture of claim 1, further comprising said receiver for receiving the amplified perturbed optical signal.

7. The architecture of claim 1, further comprising an optical pump source for pumping said amplifier, said pump source directing pump energy through said return fiber.

8. The architecture of claim 7, wherein said pump source includes a laser.

9. The architecture of claim 1, wherein said amplifier includes erbium doped fiber.

10. The architecture of claim 1, wherein said amplifier includes praseodymium doped fiber.

11. The architecture of claim 1, wherein said amplifier is a Raman amplifier.

12. The architecture of claim 1, wherein said sensor is an interferometric sensor.

13. The architecture of claim 12, wherein said sensor is an acoustic sensor.

14. The architecture of claim 1, wherein said at least one sensor comprises an array of sensors.

15. The architecture of claim 14, wherein said array comprises between 6 and 12 sensors.

16. The architecture of claim 14, wherein said array comprises between 2 and 20 sensors.

17. The architecture of claim 14, wherein the input optical signal is multiplexed within said array according to at least one arrangement selected from the group consisting of frequency division multiplexing, time division multiplexing, and wavelength division multiplexing.

18. The architecture of claim 1, further comprising a pump distribution fiber between said amplifier and a pump source, said pump distribution fiber distributing pump energy from the pump source to said amplifier.

19. The architecture of claim 18, wherein the optical distance separating said amplifier and the receiver is between about 10 km and about 130 km.

20. The architecture of claim 18, wherein the optical distance separating said amplifier and the receiver is between about 20 km and about 80 km.

21. The architecture of claim 18, wherein an optical distance of between about 10 km and about 200 km separates said sensor and the receiver.

22. The architecture of claim 18, wherein an optical distance of between about 40 km and about 120 km separates said sensor and the receiver.

23. An optical sensor architecture which receives an input optical signal from a signal source and which outputs a perturbed optical signal to a receiver, comprising:
   at least one sensor which receives the input optical signal and which outputs the perturbed optical signal;
   a signal distribution fiber disposed between the signal source and said sensor to distribute the input optical signal to said sensor;
   a return fiber disposed between said sensor and the receiver to couple the perturbed optical signal from said sensor to the receiver;
   first and second optical amplifiers positioned along said return fiber at an optical distance at least 10 kilometers from the receiver, said first and second optical amplifiers receiving and amplifying the perturbed optical signal, the amplified perturbed optical signal being sent to the receiver, said first amplifier being located between said second amplifier and said sensor in the optical path; and
   at least one pump distribution fiber for pumping said amplifiers, said at least one pump distribution fiber coupled to at least one pump source.

24. The architecture of claim 23, comprising respective pump distribution fibers for pumping each of said amplifiers.

25. The architecture of claim 23, wherein the optical distance separating the receiver from said second amplifier is between about 10 km and about 100 km.

26. The architecture of claim 23, wherein the optical distance separating the receiver from said second amplifier is between about 20 km and about 80 km.

27. The architecture of claim 23, wherein the optical distance separating the receiver from said first amplifier is between about 10 km and about 150 km.

28. The architecture of claim 23, wherein the optical distance separating the receiver from said first amplifier is between about 40 km and about 150 km.

29. The architecture of claim 23, wherein the optical distance separating the receiver from said sensor is between about 10 km and about 200 km.

30. The architecture of claim 23, wherein the optical distance separating the receiver from said sensor is between about 40 km and about 180 km.

31. The architecture of claim 23, wherein the power of the optical signal entering said second optical amplifier is greater than the power of the optical signal entering said first optical amplifier.

32. The architecture of claim 23, wherein said amplifiers are coupled to respective pump sources.

33. The architecture of claim 23, further comprising said receiver for receiving the amplified perturbed optical signal.

34. The architecture of claim 23, further comprising said at least one optical pump source.

35. The architecture of claim 34, wherein said at least one pump source includes a laser.

36. The architecture of claim 23, wherein said amplifiers include fiber doped with erbium or praseodymium.

37. The architecture of claim 23, wherein said amplifier is a Raman amplifier.

38. The architecture of claim 23, wherein said sensor is an interferometric sensor.

39. The architecture of claim 38, wherein said sensor is an acoustic sensor.

40. The architecture of claim 23, wherein said at least one sensor comprises an array of sensors.

41. The architecture of claim 23, wherein said array comprises between 6 and 12 sensors.

42. The architecture of claim 23, wherein said array comprises between 2 and 20 sensors.

43. The architecture of claim 40, wherein the input optical signal is multiplexed within said array according to at least one arrangement selected from the group consisting of frequency division multiplexing, time division multiplexing, and wavelength division multiplexing.

44. An optical sensor architecture which receives an input optical signal from a signal source and which outputs a perturbed optical signal to a receiver, comprising:
   at least one sensor which receives the input optical signal and which outputs the perturbed optical signal;
   a signal distribution fiber disposed between said sensor and the signal source to distribute the input optical signal to said sensor;
   an optical amplifier positioned along said signal distribution fiber at an optical distance at least 10 kilometers from the signal source for receiving and amplifying the optical signal;
   a return fiber disposed between said sensor and the receiver to receive the perturbed optical signal;
   an optical amplifier positioned along said return fiber at an optical distance at least 10 kilometers from the receiver for receiving and amplifying the perturbed optical signal, the amplified perturbed optical signal being sent to the receiver; and
   at least one pump distribution fiber between at least one optical pump source and at least one of said signal distribution fiber amplifier and said return fiber amplifier.

45. The optical sensor architecture of claim 44, comprising:
   a pump distribution fiber between said signal distribution fiber amplifier and a first optical pump source; and
   a pump distribution fiber between said return fiber amplifier and a second optical pump source.

46. The architecture of claim 44, wherein said amplifiers are contained within a common housing.

47. The architecture of claim 44, wherein at least one of the optical distances is between about 10 km and about 130 km.

48. The architecture of claim 44, wherein at least one of the optical distances is between about 20 km and about 80 km.

49. The architecture of claim 44, wherein an optical distance of between about 10 km and about 200 km separates said sensor and the receiver.

50. The architecture of claim 44, wherein an optical distance of between about 40 km and about 180 km separates said sensor and the receiver.

51. The architecture of claim 44, further comprising said receiver for receiving the amplified perturbed optical signal.

52. The architecture of claim 44, further comprising said pump sources.

53. The architecture of claim 44, wherein said pump sources includes a laser.

54. The architecture of claim 44, wherein said amplifiers include fiber doped with erbium or praseodymium.

55. The architecture of claim 44, wherein said amplifiers include a Raman amplifier.

56. The architecture of claim 44, wherein said sensor is an interferometric sensor.

57. The architecture of claim 56, wherein said sensor is an acoustic sensor.

58. The architecture of claim 44, wherein said at least one sensor comprises an array of sensors.

59. The architecture of claim 58, wherein said array comprises between 6 and 12 sensors.

60. The architecture of claim 58, wherein said array comprises between 2 and 20 sensors.

61. The architecture of claim 58, wherein the input optical signal is multiplexed within said array according to at least one arrangement selected from the group consisting of frequency division multiplexing, time division multiplexing, and wavelength division multiplexing.

62. The architecture of claim 44, further comprising:
   an additional amplifier along said return fiber; and
   an additional pump distribution fiber for distributing pump energy to said additional amplifier.

63. An optical sensor architecture which receives an input optical signal from a signal source and which outputs a perturbed optical signal to a receiver, comprising:
   at least one sensor which receives the input optical signal and which outputs the perturbed optical signal;
   a signal distribution fiber disposed between said sensor and the signal source to distribute the input optical signal to said sensor;
   an optical amplifier positioned along said signal distribution fiber at an optical distance at least 10 kilometers from the signal source for receiving and amplifying the optical signal;
   a return fiber disposed between said sensor and the receiver to receive the perturbed optical signal;
   first and second optical amplifiers positioned along said return fiber at optical distances at least 10 kilometers from the receiver for receiving and amplifying the perturbed optical signal, the amplified perturbed optical signal being sent to the receiver, said first optical amplifier being located between said second amplifier and said sensor in the optical path; and
   at least one pump distribution fiber between at least one optical pump source and at least one of said signal distribution fiber amplifier and said return fiber amplifiers.

64. The architecture of claim 63, comprising respective pump distribution fibers for pumping each of said amplifiers, wherein each of said pump distribution fibers is coupled to a respective pump source.

65. The architecture of claim 63, wherein said distribution amplifier and said second return amplifier are contained within a common housing.

66. The architecture of claim 63, wherein said first return amplifier and the receiver are separated by an optical distance of between about 10 km and about 150 km.

67. The architecture of claim 63, wherein said first return amplifier and the receiver are separated by an optical distance of between about 40 km and about 150 km.

68. The architecture of claim 63, wherein said second return amplifier and the receiver are separated by an optical distance of between about 10 km and about 100 km.

69. The architecture of claim 63, wherein said second return amplifier and the receiver are separated by an optical distance of between about 10 km and about 80 km.

70. The architecture of claim 63, wherein said distribution amplifier and the signal source are separated by an optical distance of between about 10 km and about 100 km.

71. The architecture of claim 63, wherein said distribution amplifier and the signal source are separated by an optical distance of between about 10 km and about 80 km.

72. The architecture of claim 63, wherein said sensor and the receiver are separated by an optical distance of between about 10 km and about 250 km.

73. The architecture of claim 63, wherein the power of the optical signal entering said second optical amplifier is greater than the power of the optical signal entering said first optical amplifier.

74. The architecture of claim 63, further comprising said receiver for receiving the amplified perturbed optical signal.

75. The architecture of claim 63, further comprising said pump sources.

76. The architecture of claim 63, wherein said pump sources includes a laser.

77. The architecture of claim 63, wherein said amplifiers include fiber doped with erbium or praseodymium.

78. The architecture of claim 63, wherein said amplifiers include a Raman amplifier.

79. The architecture of claim 63, wherein said sensor is an interferometric sensor.

80. The architecture of claim 79, wherein said sensor is an acoustic sensor.

81. The architecture of claim 63, wherein said at least one sensor comprises an array of sensors.

82. The architecture of claim 81, wherein said array comprises between 6 and 12 sensors.

83. The architecture of claim 81, wherein said array comprises between 2 and 20 sensors.

84. The architecture of claim 81, wherein the input optical signal is multiplexed within said array according to at least one arrangement selected from the group consisting of frequency division multiplexing, time division multiplexing, and wavelength division multiplexing.

* * * * *